United States Patent
Nie et al.

(10) Patent No.: US 9,674,141 B2
(45) Date of Patent: Jun. 6, 2017

(54) TECHNIQUES FOR IMPLEMENTING A SECURE MAILBOX IN RESOURCE-CONSTRAINED EMBEDDED SYSTEMS

(71) Applicant: INTEL CORPORATION, Santa Clara, CA (US)

(72) Inventors: Jiu-Tao Nie, Beijing (CN); Mingqiu Sun, Beaverton, OR (US); Chengrui Deng, Beijing (CN); Xin Wang, Beijing (CN); Ligang Wang, Beijing (CN); Gopinatth Selvaraje, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 79 days.

(21) Appl. No.: 14/369,567

(22) PCT Filed: Dec. 27, 2013

(86) PCT No.: PCT/CN2013/090671
§ 371 (c)(1),
(2) Date: Jun. 27, 2014

(87) PCT Pub. No.: WO2015/096120
PCT Pub. Date: Jul. 2, 2015

(65) Prior Publication Data
US 2015/0195236 A1    Jul. 9, 2015

(51) Int. Cl.
*H04L 29/06* (2006.01)
*H04L 12/58* (2006.01)
(Continued)

(52) U.S. Cl.
CPC ............ *H04L 63/02* (2013.01); *G06F 21/554* (2013.01); *G06F 21/566* (2013.01); *G06F 21/57* (2013.01); *H04L 51/22* (2013.01)

(58) Field of Classification Search
CPC ....... H04L 51/22; H04L 63/02; G06F 21/554; G06F 21/566; G06F 21/57
See application file for complete search history.

(56) References Cited

U.S. PATENT DOCUMENTS

| 5,133,053 A | * | 7/1992 | Johnson | .................. | H04L 29/00 |
| | | | | | 709/223 |
| 5,210,828 A | * | 5/1993 | Bolan | .................. | G06F 15/167 |
| | | | | | 709/214 |

(Continued)

OTHER PUBLICATIONS

Maniatis, Petros, and Byung-Gon Chun. "Small trusted primitives for dependable systems." ACM SIGOPS Operating Systems Review 45.1 (2011): 126-141.*

(Continued)

*Primary Examiner* — Kari Schmidt

(57) ABSTRACT

Various embodiments are generally directed to implementing a secure mailbox in resource-constrained embedded systems. An apparatus to establish communication with a trusted execution environment includes a processor component, a co-processor component for executing the trusted execution environment, a host operating system component for execution by the processor component and including one or more application components, a mailbox array component for execution by the co-processor to store one or more mailbox components, each mailbox component being associated with a mailbox identification number, and a mailbox firewall component for execution by the co-processor component to facilitate communication between the one or more application components and the one or more mailbox components. Other embodiments are described and claimed.

19 Claims, 10 Drawing Sheets

(51) Int. Cl.
*G06F 21/55* (2013.01)
*G06F 21/57* (2013.01)
*G06F 21/56* (2013.01)

(56) References Cited

U.S. PATENT DOCUMENTS

| | | | | |
|---|---|---|---|---|
| 5,483,647 | A * | 1/1996 | Yu | G06F 9/4843 |
| | | | | 703/26 |
| 5,826,105 | A * | 10/1998 | Burstein | G06F 13/124 |
| | | | | 710/10 |
| 5,944,823 | A * | 8/1999 | Jade | H04L 29/06 |
| | | | | 726/15 |
| 6,047,284 | A * | 4/2000 | Owens | G06F 17/30607 |
| 6,052,379 | A * | 4/2000 | Iverson | H04J 3/247 |
| | | | | 370/232 |
| 6,434,676 | B1 * | 8/2002 | Perloff | G06F 5/14 |
| | | | | 710/52 |
| 6,665,210 | B1 * | 12/2003 | Harvey | G06F 17/30949 |
| | | | | 365/185.03 |
| 8,533,408 | B1 * | 9/2013 | Madnani | G06F 3/0604 |
| | | | | 711/162 |
| 8,959,487 | B2 * | 2/2015 | Kuwajima | 717/124 |
| 2003/0182464 | A1 * | 9/2003 | Hamilton | G06F 9/546 |
| | | | | 719/314 |
| 2008/0155562 | A1 * | 6/2008 | Stenfort | G06F 13/385 |
| | | | | 719/318 |
| 2010/0083283 | A1 * | 4/2010 | Kharat | G06F 9/5077 |
| | | | | 719/319 |
| 2010/0121927 | A1 * | 5/2010 | Zhang | G06F 9/54 |
| | | | | 709/206 |
| 2011/0040915 | A1 * | 2/2011 | Strauss | G06F 9/4818 |
| | | | | 710/267 |
| 2011/0145423 | A1 * | 6/2011 | Burns | H04L 69/18 |
| | | | | 709/228 |
| 2012/0005460 | A1 * | 1/2012 | Inoue | G06F 9/45525 |
| | | | | 712/226 |
| 2013/0290454 | A1 * | 10/2013 | Watt | H04L 29/08153 |
| | | | | 709/206 |
| 2015/0089134 | A1 * | 3/2015 | Mukherjee | G06F 15/78 |
| | | | | 711/114 |
| 2015/0302199 | A1 * | 10/2015 | Page | G06F 21/554 |
| | | | | 713/1 |

OTHER PUBLICATIONS

Huang, Hai, Padmanabhan Pillai, and Kang G. Shin. "Improving Wait-Free Algorithms for Interprocess Communication in Embedded Real-Time Systems." Proceedings of the General Track of the annual conference on USENIX Annual Technical Conference. USENIX Association, 2002. (pp. 303-316).*
R. Obermaisser, H. Kopetz and C. Paukovits, "A Cross-Domain Multiprocessor System-on-a-Chip for Embedded Real-Time Systems," in IEEE Transactions on Industrial Informatics, vol. 6, No. 4, pp. 548-567, Nov. 2010.*
Siberschatz et al., "Applied Operating System Concepts", John Wiley & Sons, Inc. New York (2000), sec. "4.5.2.2 Indirect Communication" p. 105.
"D-Bus", Wikipedia, retrieved from <http://en.wikipedia.org/wiki/D-Bus>, 3 pages, (Author unknown).
"Firewall", Wikipedia, retrieved from <http://en.wikipedia.org/wiki/Firewall_(computing)>, 1 page (Author unknown).
Love, Robert, "Get on the D-Bus", Linux Journal, retrieved from <http://www.linuxjournal.com/article/7744>, Jan. 5, 2005, 4 pages.

* cited by examiner

300

400 ered resources. A secure mailbox may be used to communicate messages between a host operating system executed by a processor component and a trusted execution environment executed by a secure co-processor component.

TECHNIQUES FOR IMPLEMENTING A SECURE MAILBOX IN RESOURCE-CONSTRAINED EMBEDDED SYSTEMS

TECHNICAL FIELD

Embodiments described herein generally relate to implementing a secure mailbox system in embedded systems, which may be constrained in available resources. A secure mailbox may be used to communicate messages between a host operating system executed by a processor component and a trusted execution environment executed by a secure co-processor component.

BACKGROUND

It has become desirable to provide secure environments, sometimes referred to as trusted execution environments, to execute certain applications that require increased security, such as e-commerce, for example. A trusted execution environment may utilize a secure co-processor unit executing on a dedicated portion of a chipset. A trusted execution environment may be used to execute an entire application, or a portion of an application containing sensitive operations, which may minimize the risk of the application, or operations performed by the application, being compromised by a security threat.

Trusted execution environments, while generally executing separately from a host operating system, still require information from the host operating system to perform secure operations. Typically, a mailbox, which may be a storage component or logical object stored therein, may be used to transmit messages containing data between a host operating system and a trusted execution environment. In short, messages may be placed into a mailbox by the host operating system and later retrieved from the mailbox by the trusted execution environment, and vice versa. In addition to transmitting messages, a mailbox infrastructure may be used to securely route messages between applications and mailboxes within the trusted execution environment specifically assigned to those applications.

Some trusted execution environments may be resource-constrained because they may operate using a co-processor, which may have less resources than a primary processing unit. As such, a trusted execution environment may be limited in memory capacity and processing power. Thus, mailboxes advantageously may be implemented in a manner such that minimal resources are used to transmit messages between a host operating system and a trusted execution environment.

DETAILED DESCRIPTION

Figure 1:
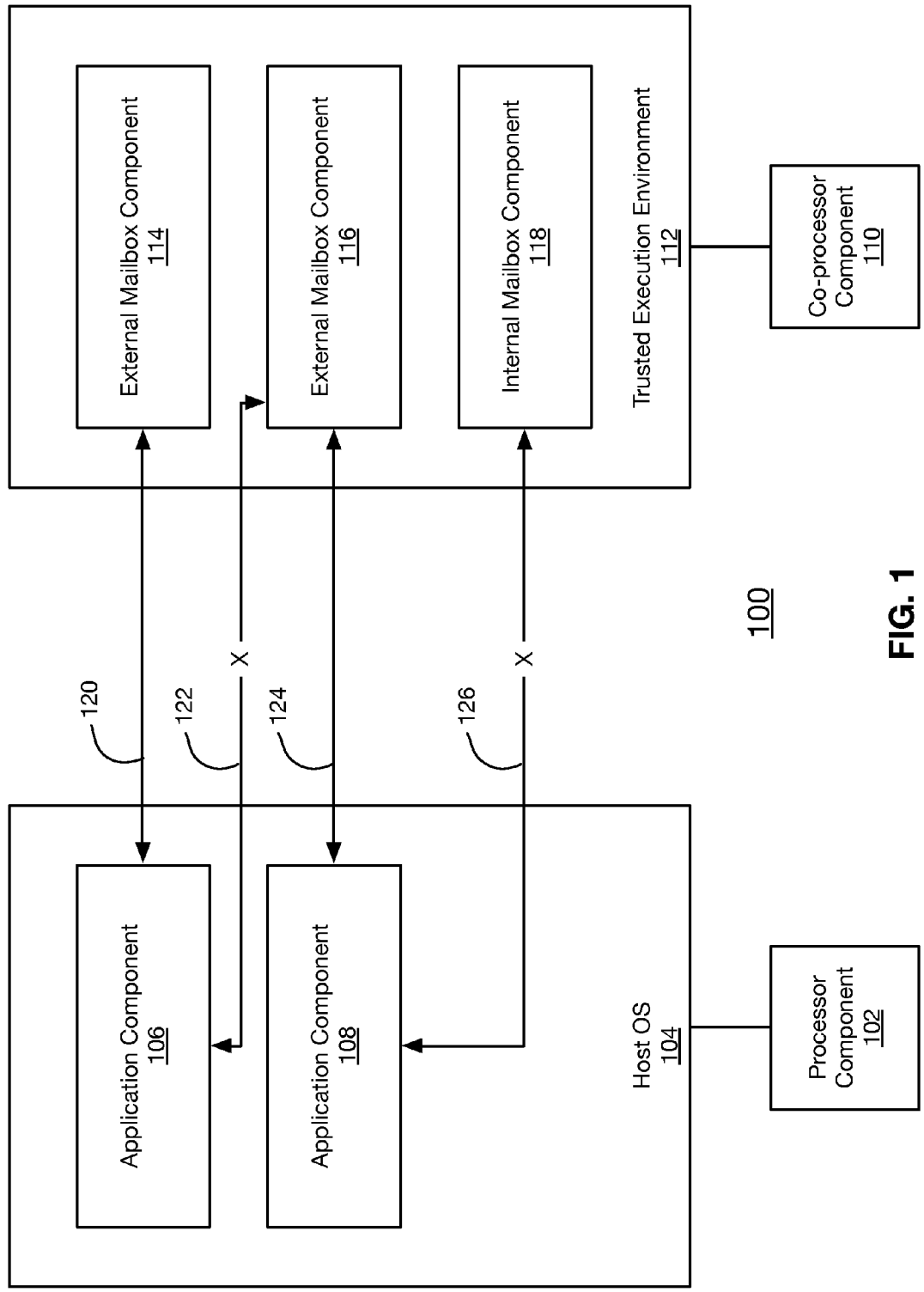
FIG. 1 illustrates an embodiment of a secure mailbox system.

Various embodiments are generally directed to techniques to implement a secure mailbox in resource-constrained embedded systems. More specifically, a system may include a host operating system executed by a processor component and a trusted execution environment executed by a co-processor component. The trusted execution environment may include a mailbox array component itself including one or more mailbox components. Each mailbox component may be associated with a mailbox identification number. The mailbox identification number may be used to uniquely identify each mailbox component. Further, the mailbox identification number may be formatted as to uniquely identify each mailbox component utilizing a reduced storage requirement. For example, each mailbox identification number may be m bits, where m is a positive integer that represents a number of bits representing n+s, where n is a positive integer representing a number of mailboxes and s is a positive integer representing the size of a serial number. In this manner, each mailbox component may be uniquely identified using minimal storage resources.

A plurality of components may interface with the mailbox array component to manage one or more of the mailbox components therein. For example, a mailbox allocation component may be configured to detect a startup operation of the system and, once detected, reset a global serial number value to zero. In this manner, mailbox component serial numbers may be reused by the system and may remain relatively small in size. Once the system has been reset, one or more mailbox components within the system may be allocated for communicating between a host operating system and a trusted execution environment. The mailbox allocation component may receive a request for mailbox allocation and, in response, locate an unused mailbox component from the mailbox array component, retrieve a mailbox index number for the located unused mailbox component, assign a serial number to located unused mailbox component, and use the mailbox index number and assigned serial number to generate and assign a mailbox identification number. The allocation process may repeat for each of the available mailbox components within a mailbox array component.

In an embodiment, a mailbox search component may be used to locate a mailbox component with a mailbox array component. For example, an application component executing on a host operating system may choose to locate a particular mailbox component within a mailbox array component. The application component may send a request including a mailbox identification number to the mailbox search component. Upon receiving such a request, the mailbox search component may determine whether the received mailbox identification number matches an existing mailbox identification number associated with a mailbox component within the mailbox array component. If a match is determined, the mailbox search component may return a response, such as the mailbox identification number, to the application component executing on the host operating system. If no match is found, the mailbox search component may return a different response, such as a NULL value, indicating that no matching mailbox component was found.

In some embodiments, a mailbox reclaiming component may be used to reassign a mailbox identification number to a mailbox component that has already been allocated. This may occur when a mailbox component has already been allocated, but due to changes in a host operating system, or application components executed therein, a mailbox component needs to be utilized in a different manner. Upon receiving a reclaim request from a host operating system including a mailbox identification number, the mailbox reclaiming component may search for a matching mailbox component. The search may be performed using a mailbox search component, for example. If a match is found, the mailbox identification number for a matching mailbox component may be changed to a new value. In an embodiment, the mailbox identification number may be incremented by 1.

A trusted execution environment may further include a firewall component. The firewall component may store one or more records, with each record associating a mailbox component with an address for a host application. In this manner, a firewall component may act as a manager of messages sent to a mailbox array component and ensure that messages are only delivered to mailboxes that are properly associated with sending applications. Proper management of message by the firewall component may eliminate malicious messages, or unwanted access, to mailbox components within a trusted execution environment.

A plurality of components may interface with the firewall component to manage one or more firewall records therein. For example, a firewall initialization component may allocate firewall record slots within the firewall component. Each firewall record may include a mailbox identification number and an address for an application component. This pair of values may be used to ensure that only an associated application component may provide messages to a particular mailbox component. In an embodiment, a firewall record may be created for each mailbox component within a mailbox array component.

A firewall mailbox allocation component may be used by a host operation system, or application components executing therein, to assign a mailbox component for use with a particular application component. The firewall mailbox allocation component may receive a request for mailbox allocation from an application component. In response to the request, the firewall mailbox allocation component may create a new firewall record slot. The creation of a new firewall record slot may include creating a new data object, or utilizing an existing, but unused, data object, for example. The firewall mailbox allocation component may further identify an available mailbox component and store within the new firewall record slot an address for the requesting application component.

In an embodiment, a firewall messaging confirmation component may act as a manager for messages received from a host operating system. Application components executing within a host operating system may send one or more messages to a firewall component. The firewall messaging confirmation component may receive a message from an application component. The received message may include a mailbox identification number and an address for the sending application component. In response, the firewall messaging confirmation component may locate a mailbox component within a mailbox array component that matches the received mailbox identification number. If a match is found, the firewall messaging confirmation component may compare an application component address from within a firewall record slot that is associated with the mailbox identification number with the received application component address. If a match is found, the received message may be stored within the identified mailbox component. If no match is found, a NULL value may be returned to the application component responsible for sending the message.

With general reference to notations and nomenclature used herein, portions of the detailed description that follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives within the scope of the claims.

FIG. 1 is a block diagram of an embodiment of a secure embedded system 100 incorporating a processor component 102 and a co-processor component 110. Processor component 102 and co-processor component 110 may be included on the same chipset, or may be used on different chipsets of the same system, or disparate systems. A host operating system component 104 may execute on processor component 102. A trusted execution environment 112 may execute on co-processor component 110. Each of these, processor component 102, co-processor component 110, host operating system component 104, and trusted execution environment 112, may be included in any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

A trusted execution environment 112 may include a plurality of mailbox components, which may be physical storage locations within a storage component or logical objects, for example. An internal mailbox component 118 may be reserved for co-processor operations and external mailbox components 114 and 116 may be reserved for use my external application components running on host operating system 104, for example. As discussed in more detail below, the plurality of mailbox components included within trusted execution environment 112 may be part of a larger mailbox array component. As discussed below with respect to FIGS. 3 and 4, each mailbox component may be associated with a mailbox identification number. The mailbox identification number may be used to uniquely identify each mailbox component. Further, the mailbox identification number may be formatted as to uniquely identify each mailbox component utilizing a reduced storage requirement. For example, each mailbox identification number may be m bits, where m is a positive integer that represents a number of bits representing n+s, where n is a positive integer representing a number of mailboxes and s is a positive integer representing the size of a serial number. In this manner, each mailbox component may be uniquely identified using minimal storage resources.

In an embodiment, host operating system component 104 may include a plurality of application components 106, 108, for example. Of course, one of skill in the art would readily recognize that more or less application components may be executed by host operating system component 104. Each of application components 106, 108 may communicate with trusted execution environment 112 using requests 120-126 which may be messages intended for one or more mailbox components. As illustrated, not all requests may be proper and some may be denied. For example, request 120, which is intended for an external mailbox component 114 may be accepted because application component 106 has been granted access to, and has been associated with, external mailbox component 114. Likewise, a request 124 from application component 108 to external mailbox component 116 may be accepted. In another example, request 122 from application component 106 to external mailbox component 116 may be denied because the proper permissions and associations between these two components have not been established. Likewise, a request 126 from application component 108 to internal mailbox component 118 may be denied.

Figure 2:
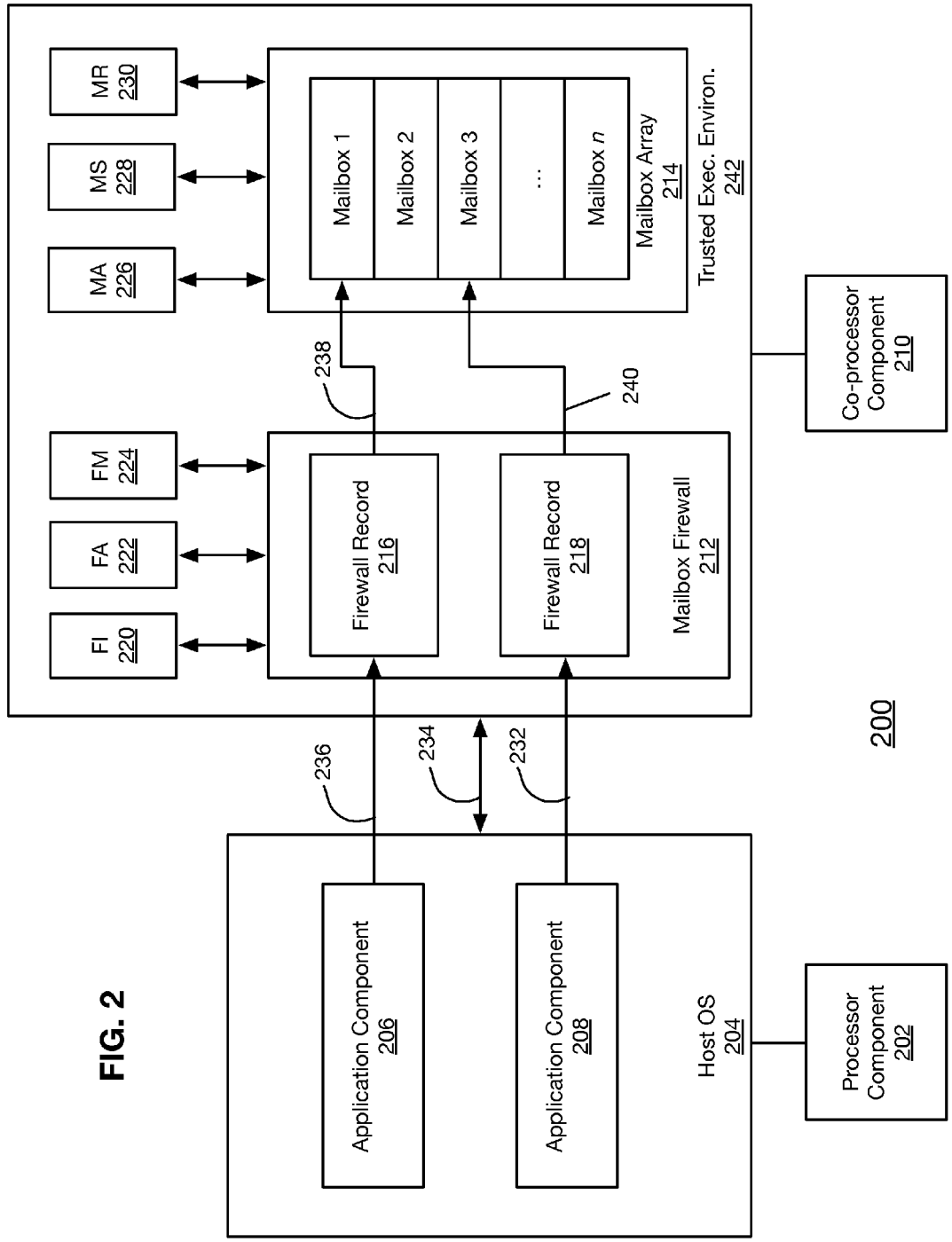
FIG. 2 illustrates an embodiment of a secure mailbox system.

FIG. 2 illustrates a block diagram of an embodiment of a secure embedded system 200 incorporating processor component 202 and co-processor component 210. Processor component 202 and co-processor component 210 may be included on the same chipset, or may be used on different chipsets of the same system, or disparate systems. A host operating system component 204 may execute on processor component 202. A trusted execution environment 242 may execute on co-processor component 210. Each of these, processor component 202, co-processor component 210, host operating system component 204, and trusted execution environment 242, may be included in any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

Host operating system component 204 may include a plurality of application components 206, 208, for example. Of course, one of skill in the art would readily recognize that more or less application components may be executed by host operating system component 204. Each of application components 206, 208 may communicate with trusted execution environment 242 using requests 232-236 which may be messages intended for one or more mailbox components or requests intended for one or more components 220-230.

In an embodiment, trusted execution environment 242 may include a mailbox array component 214 itself including one or more mailbox components (mailboxes 1-n). Each mailbox component may be associated with a mailbox identification number, as described below with respect to FIGS. 3 and 4. The mailbox identification number may be used to uniquely identify each mailbox component. Further, the mailbox identification number may be formatted as to uniquely identify each mailbox component utilizing a reduced storage requirement. For example, each mailbox identification number may be m bits, where m is a positive integer that represents a number of bits representing n+s, where n is a positive integer representing a number of mailboxes and s is a positive integer representing the size of a serial number. In this manner, each mailbox component may be uniquely identified using minimal storage resources.

A plurality of components may interface with mailbox array component 214 to manage one or more of the mailbox components 1-n therein. For example, a mailbox allocation component (MA) 226 may be configured to detect a startup operation of the system 200 and, once detected, reset a global serial number value (not shown) to zero. In this manner, mailbox component serial numbers may be reused by the system and may remain relatively small in size. Once system 200 has been reset, one or more mailbox components within the system may be allocated for communicating between host operating system component 204 and trusted execution environment 242. Mailbox allocation component 226 may receive a request for mailbox allocation and, in response, locate an unused mailbox component from mailbox array component 214, retrieve a mailbox index number for the located unused mailbox component, assign a serial number to located unused mailbox component, and use the mailbox index number and assigned serial number to generate and assign a mailbox identification number. The allocation process may repeat for each of the available mailbox components within mailbox array component 214.

In an embodiment, a mailbox search component (MS) 228 may be used to locate a mailbox component within mailbox array component 214. For example, an application component, such as application component 206 or application component 208, executed by host operating system 204 may choose to locate a particular mailbox component within a mailbox array component. The application component may send a request including a mailbox identification number to mailbox search component 228. Upon receiving such a request, mailbox search component 228 may determine whether the received mailbox identification number matches an existing mailbox identification number associated with a mailbox component within mailbox array component 214. If a match is determined, mailbox search component 228 may return a response, such as the mailbox identification number, to the application component executing on host operating system 204. If no match is found, mailbox search component 228 may return a different response, such as a NULL value, indicating that no matching mailbox component was found.

In some embodiments, a mailbox reclaiming component (MR) 230 may be used to reassign a mailbox identification number to a mailbox component that has already been allocated. This may occur when a mailbox component has already been allocated, but due to changes in a host operating system, or application components executed therein, a mailbox component needs to be utilized in a different manner. Upon receiving a reclaim request from host operating system 204 including a mailbox identification number, mailbox reclaiming component 230 may search for a matching mailbox component. From among mailbox components 1-n within mailbox array component 214. The search may be performed using mailbox search component 228, for example. If a match is found, the mailbox identification number for a matching mailbox component may be changed to a new value. In an embodiment, the mailbox identification number may be incremented by 1.

Trusted execution environment 242 may further include a firewall component 212. Firewall component 212 may store one or more records 216, 218, which may be physical storage locations within a storage component or logical objects, for example. Each firewall record may be configured to associate a mailbox component 1-n with an address for a host application, such as application component 206 or 208. In this manner, firewall component 212 may act as a manager of messages sent to mailbox array component 214 and ensure that messages are only delivered to mailboxes that are properly associated with sending applications. As illustrated, firewall component 212 may route message 236 from application component 206 to mailbox 1 as confirmed message 238. Likewise, firewall component 212 may route message 232 from application component 208 to mailbox 3 as confirmed message 240. Proper management of message by the firewall component may eliminate malicious messages, or unwanted access, to mailbox components within a trusted execution environment.

A plurality of components may interface with firewall component 212 to manage one or more firewall records 216, 218 therein. For example, firewall initialization component (FI) 220 may allocate firewall record slots, such as records 216, 218, within firewall component 212. Each firewall record may include a mailbox identification number, which may be associated with a mailbox 1-n, and an address for an application component, such as application components 206, 208, for example. This pair of values may be used to ensure that only an associated application component may provide messages to a particular mailbox component. In an embodiment, a firewall record may be created for each mailbox component within mailbox array component 214.

Firewall mailbox allocation component (FA) 222 may be utilized by host operation system 204, or application components executing therein, to assign a mailbox component for use with a particular application component. Firewall mailbox allocation component 222 may receive a request for mailbox allocation from an application component, such as application component 206 or 208. In response to the request, firewall mailbox allocation component 222 may create a new firewall record slot, such as record 216 or 218. The creation of a new firewall record slot may include creating a new data object, or utilizing an existing, but unused, data object, for example. Firewall mailbox allocation component 222 may further identify an available mailbox component 1-n from within mailbox array component 214 and store within the new firewall record slot an address for the requesting application component.

In an embodiment, firewall messaging confirmation component (FM) 224 may act as a manager for messages received from host operating system 204. Application components 206, 208 executing within host operating system 204 may send one or more messages 232, 236 to trusted execution environment 242. Each message may need to initially pass through firewall component 212, thus firewall messaging confirmation component 224 may receive a message 232, 236 from an application component 206, 208. The received message may include a mailbox identification number and an address for the sending application component. In response, firewall messaging confirmation component 224 may locate a mailbox component 1-n within mailbox array component 214 that matches the received mailbox identification number. If a match is found, firewall messaging confirmation component 224 may compare an application component address from within a firewall record slot that is associated with the mailbox identification number with the received application component address. If a match is found, the received message may be stored within the identified mailbox component, as illustrated by confirmed messages 238 and 240. If no match is found, a NULL value may be returned to the application component responsible for sending the message.

As discussed with respect to FIGS. 1 and 2, application components, firewall record slots, mailbox array components, and mailbox components may be implemented using one or more storage components within the system. In various embodiments, each of the storages may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces between components may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, such as between application components and a trusted execution environment in some embodiments, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 3:
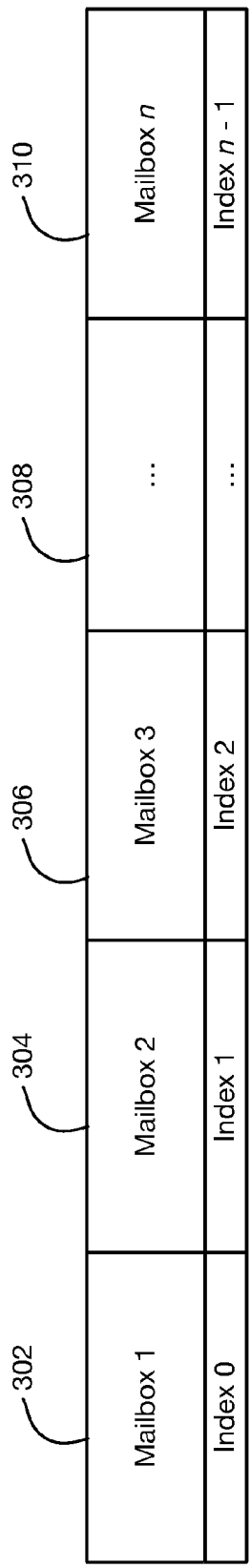
FIG. 3 illustrates an embodiment of a mailbox array component.

FIG. 3 illustrates an embodiment of the mailbox components according to an embodiment. As illustrated, a mailbox array component 300 includes a plurality of mailbox components. Each mailbox component 302-310, which represents 1-n mailbox components where n is any positive integer greater than 1, is associated with a corresponding index. In an example, the index value may range from 0 to n−1. In an embodiment, each index may be represented by m bits where m is a positive integer that represents a number of bits representing n+s, where n is a positive integer representing a number of mailboxes and s is a positive integer representing the size of a serial number. In this manner, each mailbox component may be uniquely identified using minimal storage resources.

Figure 4:
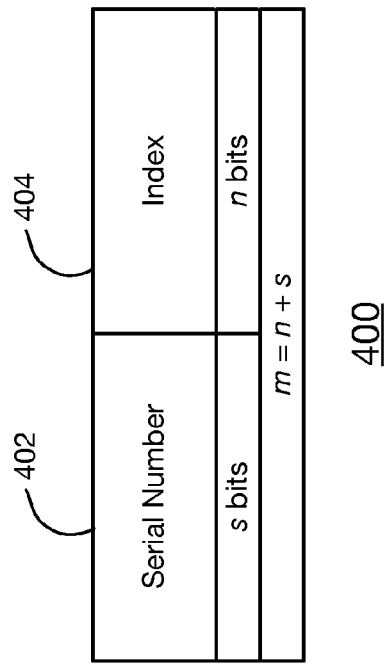
FIG. 4 illustrates an embodiment of a mailbox identification component.

FIG. 4 illustrates a block diagram of a mailbox identification component 400 according to an embodiment. More specifically, FIG. 4 depicts a mailbox identification component 400 comprising a serial number 402 and an index 404. Serial number 402 may be assigned to each of a plurality of mailbox components dynamically, such as upon system start-up. In an embodiment, index 404 may be fixed, and permanently assigned to each mailbox component. One of skill in the art, however, could envisage a situation in which a mailbox index would be dynamically assigned as well.

Serial number 402 may be a unique number assigned to each mailbox component comprising s bits, where s is a positive integer chosen such that it is large enough to keep each mailbox identification number unique according to the requirements of an embedded system. In some embodiments, 0 may not be used for a serial number so that the value of 0 may be used to represent an invalid mailbox component. In this manner, a mailbox identification scheme may be represented by a triplet (m, s, n). In a non-limiting example, a triplet of (64, 56, 8) represents 256 total mailboxes and a serial number size of 56 bits, which may be significantly lower than other serial number solutions.

Some of the following figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. For example, a logic flow may be implemented by a processor component executing instructions stored on an article of manufacture, such as a storage medium. A storage medium may comprise any non-transitory computer-readable medium or machine-readable medium, such as an optical, magnetic or semiconductor storage. The storage medium may store various types of computer executable instructions, such as instructions to implement one or more disclosed logic flows. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 5:
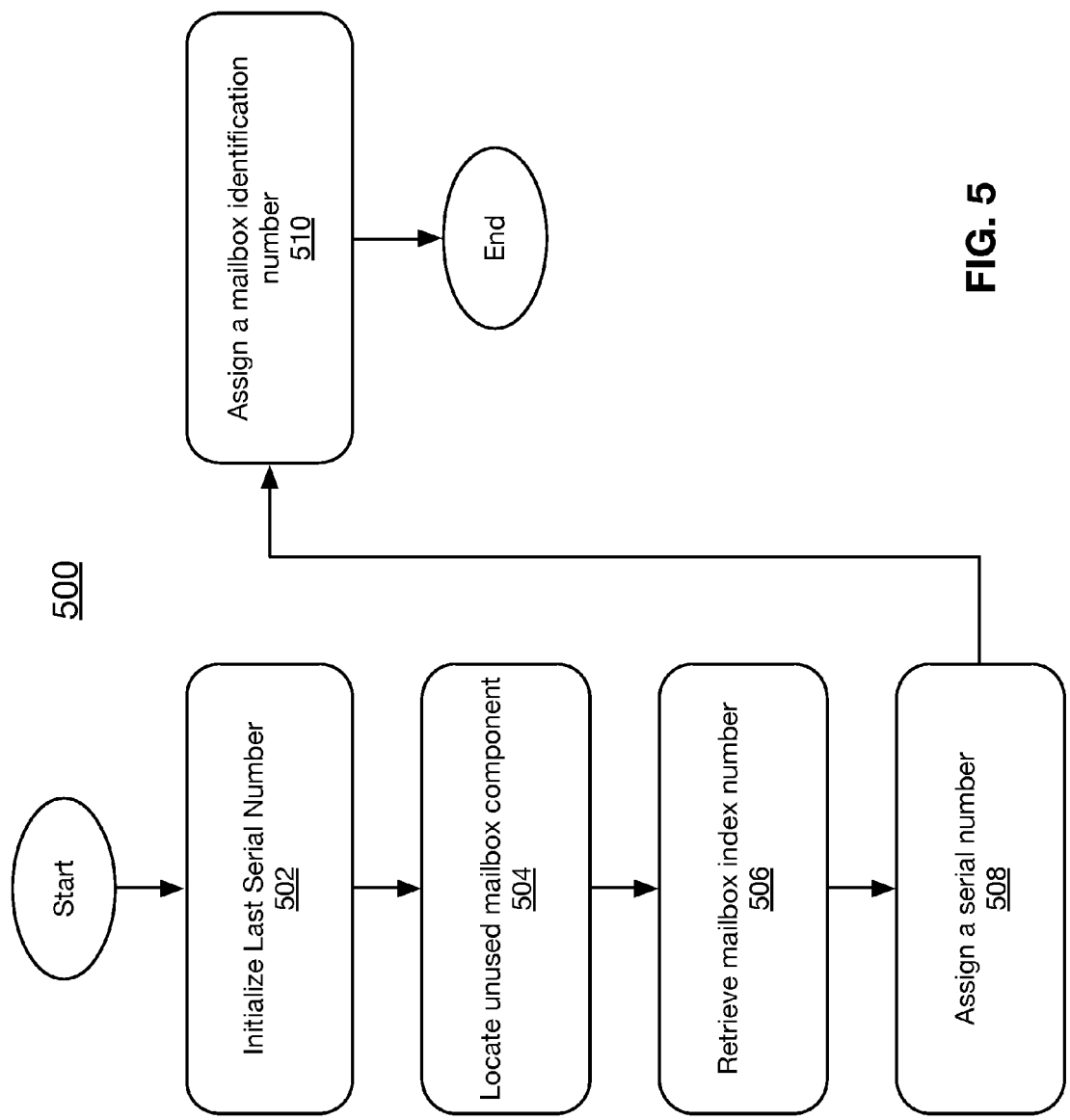
FIGS. 5-10 each illustrate a logic flow according to an embodiment.

FIG. 5 illustrates one embodiment of a logic flow 500. The logic flow 500 may be representative of some or all of the operations executed by one or more embodiments described herein. More specifically, the logic flow 500 may illustrate operations performed by a processor component in executing at least a component of host operating system 204 and/or trusted execution environment 242.

At 502, a mailbox allocation component may be configured to detect a startup operation of the system and, once detected, initialize a global serial number value by resetting the value to zero. In this manner, mailbox component serial numbers may be reused by the system and may remain relatively small in size. Once the system has been reset, one or more mailbox components within the system may be allocated for communicating between a host operating system and a trusted execution environment.

At 504, the mailbox allocation component may receive a request for mailbox allocation and, in response, locate an unused mailbox component from the mailbox array component, retrieve a mailbox index number for the located unused mailbox component.

At 506, the mailbox allocation component may retrieve an index number for the located mailbox and, at 508, assign a serial number to located unused mailbox component. At 510, the mailbox allocation component may use the mailbox index number and assigned serial number to generate and assign a mailbox identification number. The allocation process may repeat for each of the available mailbox components within a mailbox array component.

Figure 6:
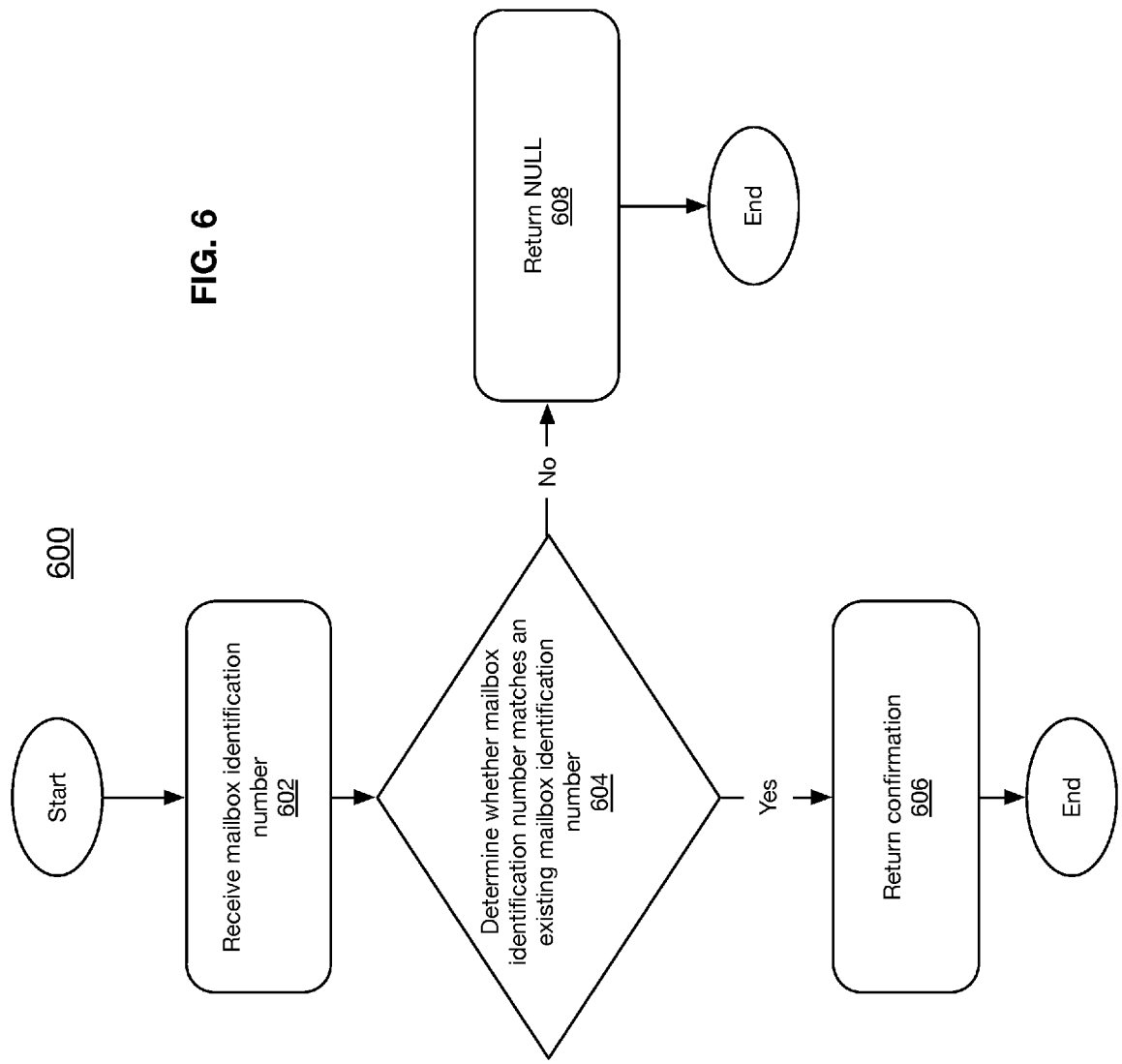

FIG. 6 illustrates one embodiment of a logic flow 600. The logic flow 600 may be representative of some or all of the operations executed by one or more embodiments described herein. More specifically, the logic flow 600 may illustrate operations performed by a processor component in executing at least a component of host operating system 204 and/or trusted execution environment 242.

At 602, a mailbox search component may receive a mailbox identification number from an application component. The received mailbox identification number may be used to locate a mailbox component with a mailbox array component. For example, an application component executing on a host operating system may choose to locate a particular mailbox component within a mailbox array component. The application component may send a request including a mailbox identification number to the mailbox search component.

At 604, upon receiving such a request, the mailbox search component may determine whether the received mailbox identification number matches an existing mailbox identification number associated with a mailbox component within the mailbox array component. If a match is determined, the mailbox search component may return a response, such as a confirmation that a matching mailbox component has been located, to the application component executing on the host operating system at 606. The confirmation may include, for example, a handle for the matching mailbox component or an indication that a matching mailbox component exists. If no match is found, the mailbox search component may return a different response, such as a NULL value, indicating that no matching mailbox component was found at 608.

Figure 7:
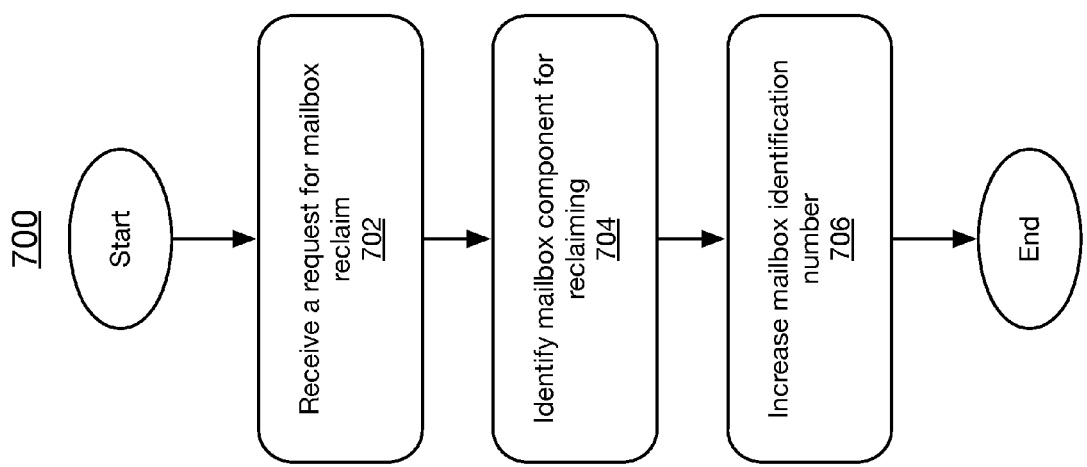

FIG. 7 illustrates one embodiment of a logic flow 700. The logic flow 700 may be representative of some or all of the operations executed by one or more embodiments described herein. More specifically, the logic flow 700 may illustrate operations performed by a processor component in executing at least a component of host operating system 204 and/or trusted execution environment 242.

A mailbox reclaiming component may be used to reassign a mailbox identification number to a mailbox component that has already been allocated. This may occur when a mailbox component has already been allocated, but due to changes in a host operating system, or application components executed therein, a mailbox component needs to be utilized in a different manner. At 702, a reclaim request may be received from an application component executed by a host operating system including a mailbox identification number.

At 704, the mailbox reclaiming component may search for and attempt to identify a matching mailbox component. The search may be performed using a mailbox search component, for example.

At 706, if a match is found, the mailbox identification number for a matching mailbox component may be changed to a new value. In an embodiment, the mailbox identification number may be incremented by 1, for example.

Figure 8:
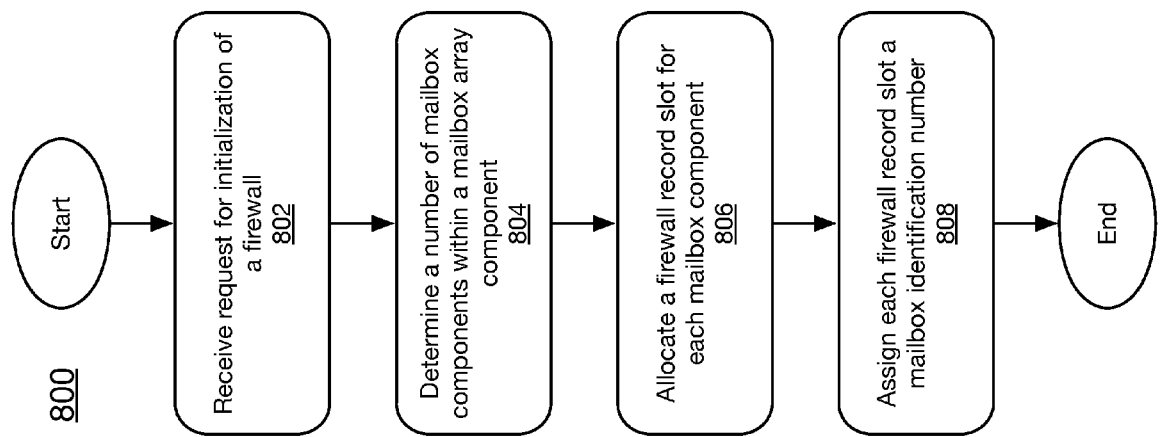

FIG. 8 illustrates one embodiment of a logic flow 800. The logic flow 800 may be representative of some or all of the operations executed by one or more embodiments described herein. More specifically, the logic flow 800 may illustrate operations performed by a processor component in executing at least a component of host operating system 204 and/or trusted execution environment 242.

At 802, a request to initialize a firewall may be received by a firewall initialization component, which is configured to allocate firewall record slots within the firewall component. Each firewall record may include a mailbox identification number and an address for an application component. This pair of values may be used to ensure that only an associated application component may provide messages to a particular mailbox component.

At 804, the firewall initialization component may determine a number of mailbox components within a mailbox array component. In this manner, a firewall record may be created for each mailbox component within a mailbox array component.

At 806, a firewall record slot may be created, or otherwise reserved, for each determined mailbox component. The creation of a new firewall record slot may include creating a new data object, or utilizing an existing, but unused, data object, for example. Once each firewall record slot has been reserved, each is assigned a mailbox identification number corresponding with a mailbox component at 808.

Figure 9:
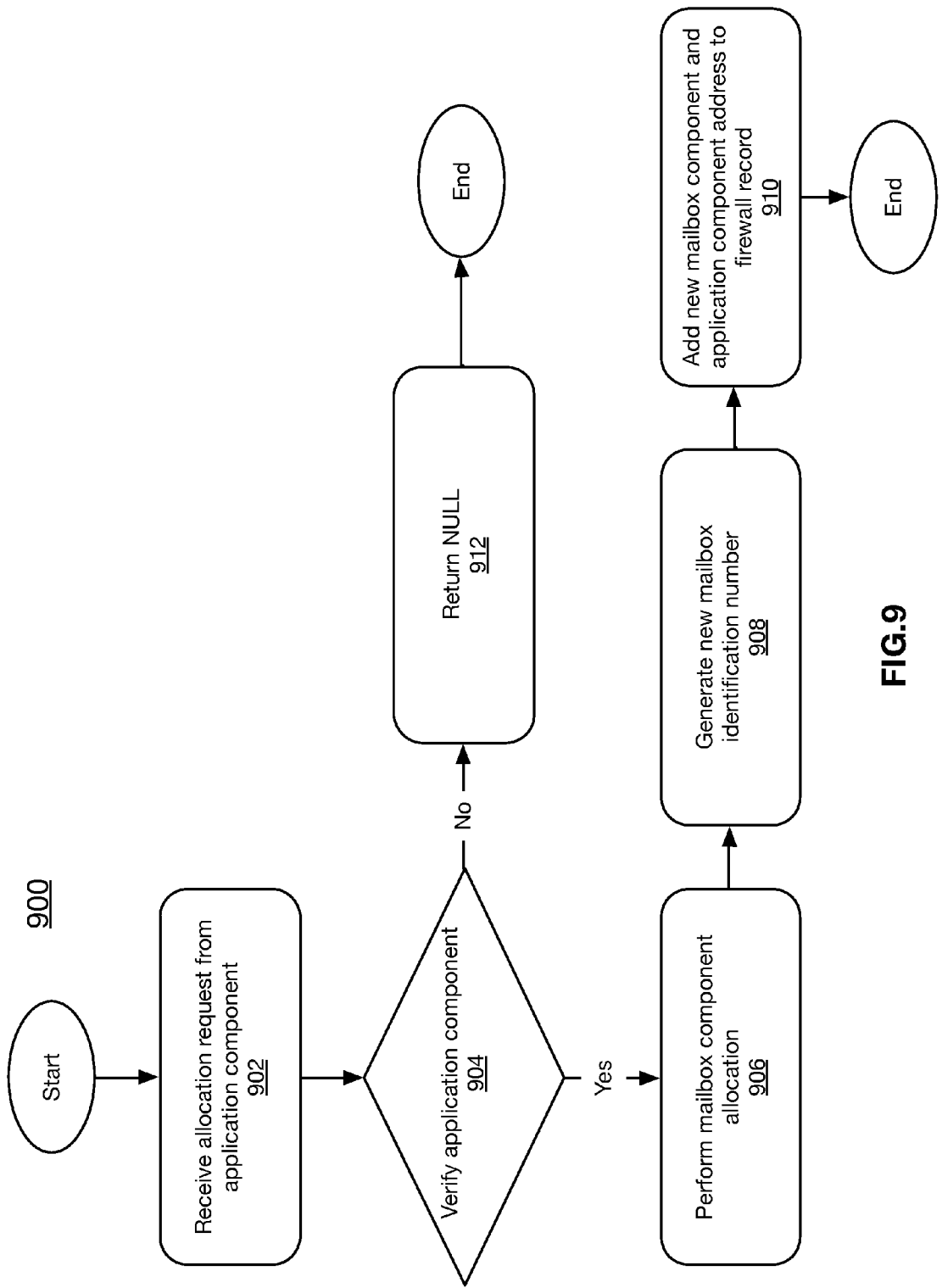

FIG. 9 illustrates one embodiment of a logic flow 900. The logic flow 900 may be representative of some or all of the operations executed by one or more embodiments described herein. More specifically, the logic flow 900 may illustrate operations performed by a processor component in executing at least a component of host operating system 204 and/or trusted execution environment 242.

A firewall mailbox allocation component may be contacted by a host operation system, or application components executing therein, to assign a mailbox component for use with a particular application component. At 902, the firewall mailbox allocation component may receive a request for mailbox allocation from an application component. The request may be sent to a public, or global, mailbox address in a trusted execution environment. In this manner, applications that have not yet been approved may make such a request.

At 904, the application component requesting allocation may be verified. This verification may consist of one or more portions of the logic flow discussed below with respect to FIG. 10, for example. If verification is successful, at 906, the firewall mailbox allocation component may create a new firewall record slot according to the logic flow discussed above with respect to FIG. 8, for example. The creation of a new firewall record slot may include creating a new data object, or utilizing an existing, but unused, data object, for example.

At 908 a new mailbox identification number may be generated, as discussed with respect to FIG. 8. In this manner, a private mailbox address in a trusted execution environment may be assigned to the requesting application component. At 910, a firewall record may be populated with a mailbox identification number for a mailbox component and an application address component. Once the firewall record has been populated, the requesting application component may communicate with the associated private mailbox address. Further, the requesting application component may continue to communicate with the global mailbox address discussed above. If verification fails, at 912, a NULL value may be returned to the requesting application component.

Figure 10:
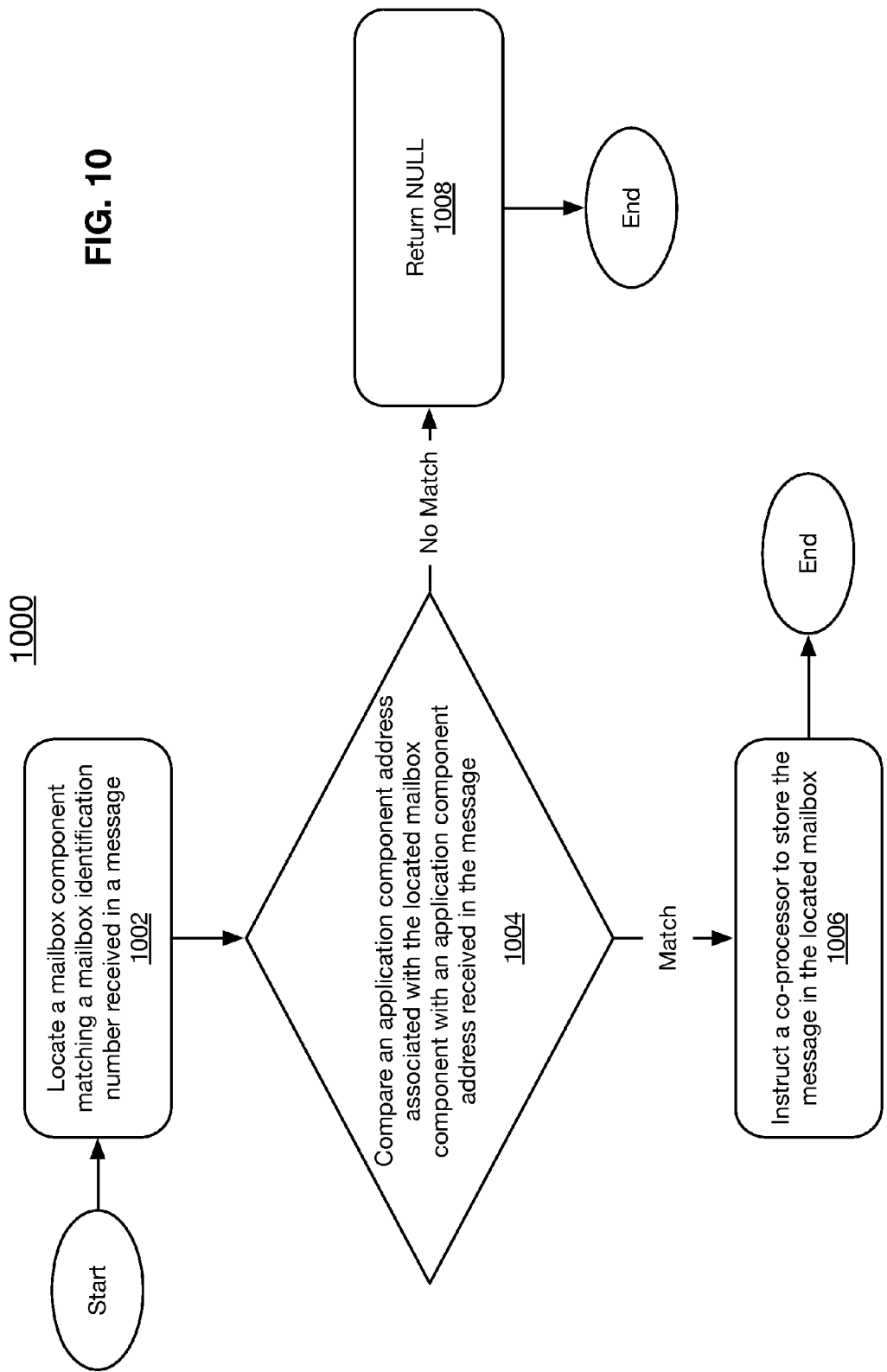

FIG. 10 illustrates one embodiment of a logic flow 1000. The logic flow 1000 may be representative of some or all of the operations executed by one or more embodiments described herein. More specifically, the logic flow 1000 may illustrate operations performed by a processor component in executing at least a component of host operating system 204 and/or trusted execution environment 242.

In an embodiment, application components executing within a host operating system may send one or more messages to a firewall component intended for a mailbox component within a mailbox array component of a trusted execution environment. The received message may include a mailbox identification number and an address for the sending application component. At 1002, a firewall messaging confirmation component may locate a mailbox component matching a mailbox identification number received in a message from an application component executed by a host operating system component.

At 1004, the firewall messaging confirmation component may compare may compare an application component address associated with a located mailbox component with an application component address received in the message. In this manner, only application components that have been associated with a particular mailbox component may be approved to send messages to that mailbox component.

At 1006, if a match is found, the received message may be stored within the identified mailbox component by a co-processor. If no match is found, a NULL value may be returned to the application component responsible for sending the message at 1008.

Figure 11:
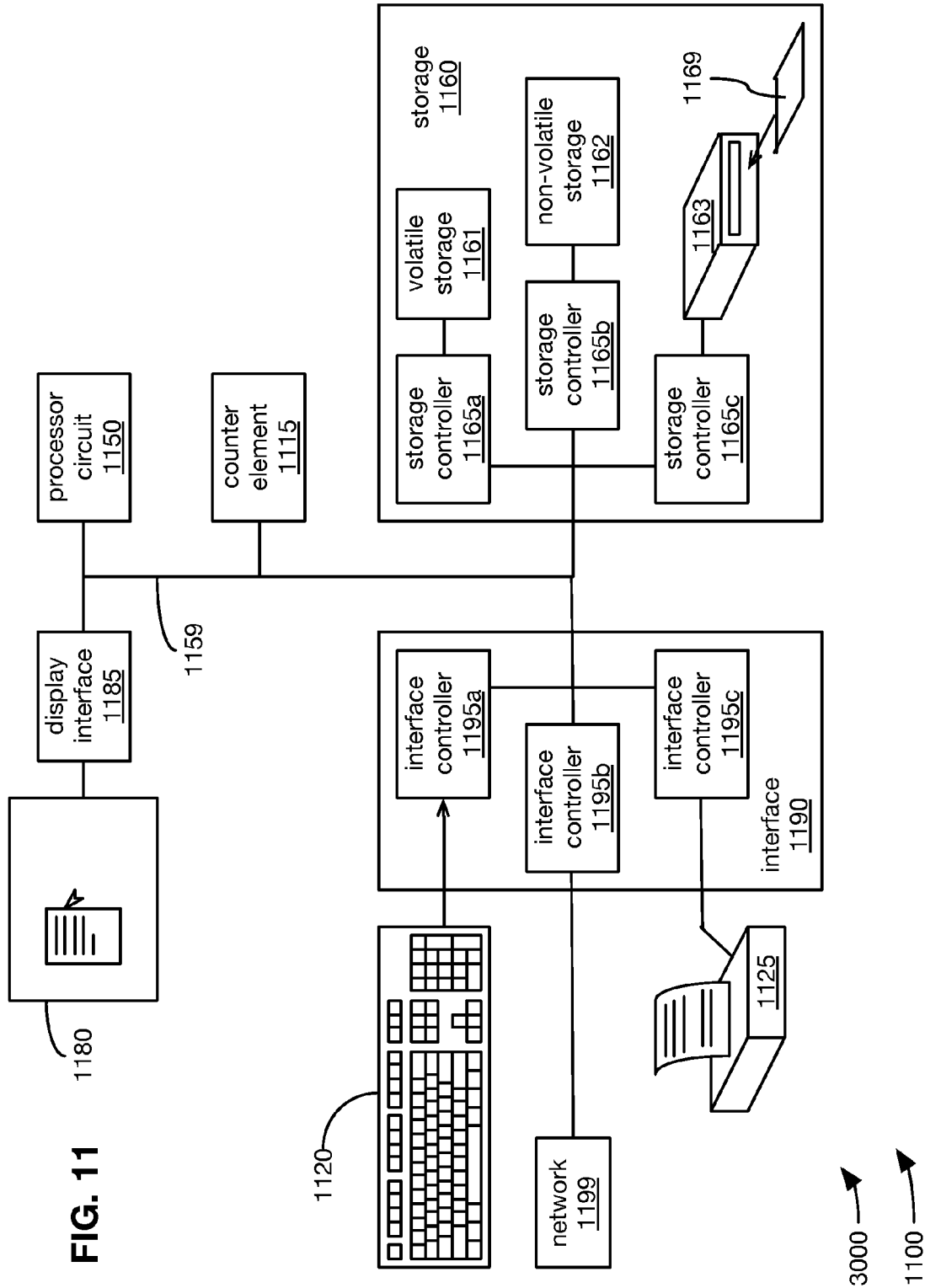
FIG. 11 illustrates a processing architecture according to an embodiment.

FIG. 11 illustrates an embodiment of a processing architecture 3000 suitable for implementing various embodiments as previously described. More specifically, the processing architecture 3000 (or variants thereof) may be implemented as part of one or more of the systems described above, such as embedded system 100 or 200, for example.

The processing architecture 3000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device may include at least a processor component 1150, a storage 1160, an interface 1190 to other devices, and a coupling 1159. As will be explained, depending on various aspects of a computing device implementing the processing architecture 3000, including its intended use and/or conditions of use, such a computing device may further include additional components, such as without limitation, a display interface 1185, or one or more processing subsystems 1100.

The coupling 1159 may include one or more buses, point-to-point interconnects, transceivers, buffers, crosspoint switches, and/or other conductors and/or logic that communicatively couples at least the processor component 1150 to the storage 1160. Coupling 959 may further couple the processor component 1150 to one or more of the interface 1190, the audio subsystem 1170 and the display interface 1185 (depending on which of these and/or other components are also present). With the processor component 1150 being so coupled by couplings 1159, the processor component 1150 is able to perform the various ones of the tasks described at length, above, for whichever one(s) of the aforedescribed computing devices implement the processing architecture 3000. Coupling 1159 may be implemented with any of a variety of technologies or combinations of technologies by which signals are optically and/or electrically conveyed. Further, at least portions of couplings 1159 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 1150 may include any of a wide variety of commercially available processors, employing any of a wide variety of technologies and implemented with one or more cores physically combined in any of a number of ways.

As previously discussed, the storage 1160 may be made up of one or more distinct storage devices based on any of a wide variety of technologies or combinations of technologies. More specifically, as depicted, the storage 1160 may include one or more of a volatile storage 1161 (e.g., solid state storage based on one or more forms of RAM technology), a non-volatile storage 1162 (e.g., solid state, ferromagnetic or other storage not requiring a constant provision of electric power to preserve their contents), and a removable media storage 1163 (e.g., removable disc or solid state memory card storage by which information may be conveyed between computing devices). This depiction of the storage 1160 as possibly including multiple distinct types of storage is in recognition of the commonplace use of more than one type of storage device in computing devices in which one type provides relatively rapid reading and writing capabilities enabling more rapid manipulation of data by the processor component 1150 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 1161 is present and is based on RAM technology, the volatile storage 1161 may be communicatively coupled to coupling 1159 through a storage controller 1165a providing an appropriate interface to the volatile storage 1161 that perhaps employs row and column addressing, and where the storage controller 1165a may perform row refreshing and/or other maintenance tasks to aid in preserving information stored within the volatile storage 1161. By way of another example, where the non-volatile storage 1162 is present and includes one or more ferromagnetic and/or solid-state disk drives, the non-volatile storage 1162 may be communicatively coupled to coupling 1159 through a storage controller 1165b providing an appropriate interface to the non-volatile storage 1162 that perhaps employs addressing of blocks of information and/or of cylinders and sectors. By way of still another example, where the removable media storage 1163 is present and includes one or more optical and/or solid-state disk drives employing one or more pieces of machine-readable storage medium 1169, the removable media storage 1163 may be communicatively coupled to coupling 1159 through a storage controller 1165c providing an appropriate interface to the removable media storage 1163 that perhaps employs addressing of blocks of information, and where the storage controller 1165c may coordinate read, erase and write operations in a manner specific to extending the lifespan of the machine-readable storage medium 1169.

One or the other of the volatile storage 1161 or the non-volatile storage 1162 may include an article of manufacture in the form of a machine-readable storage media on which a routine including a sequence of instructions executable by the processor component 1150 to implement various embodiments may be stored, depending on the technologies on which each is based. By way of example, where the non-volatile storage 1162 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to a storage medium such as a floppy diskette. By way of another example, the non-volatile storage 1162 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 1150 to implement various embodiments may initially be stored on the machine-readable storage medium 1169, and the removable media storage 1163 may be subsequently employed in copying that routine to the non-volatile storage 1162 for longer term storage not requiring the continuing presence of the machine-readable storage medium 1169 and/or the volatile storage 1161 to enable more rapid access by the processor component 1150 as that routine is executed.

As previously discussed, the interface 1190 may employ any of a variety of signaling technologies corresponding to any of a variety of communications technologies that may be employed to communicatively couple a computing device to one or more other devices. Again, one or both of various forms of wired or wireless signaling may be employed to enable the processor component 1150 to interact with input/output devices and/or other computing devices, possibly through a network (e.g., the network 1199) or an interconnected set of networks. In recognition of the often greatly different character of multiple types of signaling and/or protocols that must often be supported by any one computing device, the interface 1190 is depicted as including multiple different interface controllers 1195a, 1195b and 1195c. The interface controller 1195a may employ any of a variety of types of wired digital serial interface or radio frequency wireless interface to receive serially transmitted messages from user input devices, such as the depicted keyboard 1120. The interface controller 1195b may employ any of a variety of cabling-based or wireless signaling, timings and/or protocols to access other computing devices through the depicted network 1199 (perhaps a network made up of one or more links, smaller networks, or perhaps the Internet). The interface 1195c may employ any of a variety of electrically conductive cabling enabling the use of either serial or parallel signal transmission to convey data to the depicted printer 1125. Other examples of devices that may be communicatively coupled through one or more interface controllers of the interface 1190 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 1180), such a computing device implementing the processing architecture 3000 may also include the display interface 1185. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 1180 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

The following examples pertain to additional embodiments. Example 1 includes an apparatus to establish communication with a trusted execution environment comprising a processor component, a co-processor component for executing the trusted execution environment, a host operating system component for execution by the processor component and including one or more application components, a mailbox array component for execution by the co-processor to store one or more mailbox components, each mailbox component being associated with a mailbox identification number, and a mailbox firewall component for execution by the co-processor component to facilitate communication between the one or more application components and the one or more mailbox components.

In Example 2, the mailbox identification number includes a mailbox index number and a mailbox serial number.

In Example 3, the mailbox index number includes a number of bits m that is less than or equal to a total number of mailbox components n within the mailbox array component.

In Example 4, the mailbox serial number including a number of bits that is less than or equal to m–n.

In Example 5, a mailbox allocation component for execution by the co-processor component is configured to initialize a global last serial number value to zero in response to a system startup operation, and in response to a request for mailbox allocation: locate an unused mailbox component from the mailbox array component, retrieve a mailbox index number for the located unused mailbox component, assign a serial number to the located unused mailbox component, and assign a mailbox identification number to the located unused mailbox component that includes the mailbox index number and the serial number.

In Example 6, a mailbox search component for execution by the co-processor component is configured to receive a mailbox identification number from the one or more application components, determine whether the received mailbox identification number matches an existing mailbox identification number, if a match has been determined, confirm to the one or more application components that a match has been found, and if a match has not been determined, return a NULL value to the one or more application components.

In Example 7, a mailbox reclaiming component for execution by the co-processor component is configured to receive a reclaim request from the one or more application components identifying a mailbox component, and increase a mailbox identification number for the identified mailbox component.

In Example 8, a mailbox firewall initialization component for execution by the co-processor component is configured to allocate firewall record slots for each of the one or more mailbox components, each firewall record slot including a mailbox identification number and an application component address.

In Example 9, a firewall mailbox allocation component for execution by the co-processor component is configured to receive a request for mailbox allocation from one or more application components, and create a new firewall record slot including an application component address associated with the one or more application components and a mailbox identification number for an available mailbox component.

In Example 10, a firewall messaging confirmation component for execution by the co-processor component is configured to receive a message from one or more application components, the message including a mailbox identification number and an application component address, locate a mailbox component within the mailbox array component matching the mailbox identification number, compare an application component address associated with the located mailbox component with the received application component address, and store the message in the located mailbox component if the application component address associated with the located mailbox component matches the received application component address.

Example 11 includes a computer-implemented method for establishing communication with a trusted execution environment comprising receiving a message from one or more application components executed by a processor component, the message including a mailbox identification number, verifying the message by a firewall component executed by a co-processor component of the trusted execution environment, and upon successful verification based upon at least the mailbox identification number, storing the message in a mailbox component matching the mailbox identification number.

In Example 12, the mailbox identification number includes a mailbox index number and a mailbox serial number.

In Example 13, the mailbox index number includes a number of bits m that is less than or equal to a total number of mailbox components n within the mailbox array component.

In Example 14, the mailbox serial number including a number of bits that is less than or equal to m−n.

In Example 15, a computer-implemented method further comprises initializing a global last serial number value to zero in response to a system startup operation; and, in response to a request for mailbox allocation, locating an unused mailbox component from the mailbox array component, retrieving a mailbox index number for the located unused mailbox component, assigning a serial number to the located unused mailbox component, and assigning a mailbox identification number to the located unused mailbox component that includes the mailbox index number and the serial number.

In Example 16, a computer-implemented method further comprises receiving a mailbox identification number from the one or more application components, determining whether the received mailbox identification number matches an existing mailbox identification number, if a match has been determined, confirming to the one or more application components that a match has been found, and if a match has not been determined, returning a NULL value to the one or more application components.

In Example 17, a computer-implemented method further comprises receiving a reclaim request from the one or more application components identifying a mailbox component, and increasing a mailbox identification number for the identified mailbox component.

In Example 18, a computer-implemented method further comprises receiving a request for firewall initialization and allocating firewall record slots for each of the one or more mailbox components, each firewall record slot including a mailbox identification number and an application component address.

In Example 19, a computer-implemented method further comprises receiving a request for mailbox allocation from one or more application components and creating a new firewall record slot including an application component address associated with the one or more application components and a mailbox identification number for an available mailbox component.

In Example 20, a computer-implemented method includes wherein the message further includes an application component address and the verification comprises locating a mailbox component matching the mailbox identification number within a mailbox array component storing a plurality of mailbox components, comparing an application component address associated with the located mailbox component with the received application component address, and instructing a co-processor to store the message in the located mailbox component if the application component address associated with the located mailbox component matches the received application component address.

Example 21 includes at least one machine-readable storage medium comprising instructions that, when executed by a computing device, cause the computing device to receive a message from one or more application components executed by a processor component, the message including a mailbox identification number, verify the message by a firewall component executed by a co-processor component of the trusted execution environment, and upon successful verification based upon at least the mailbox identification number, store the message in a mailbox component matching the mailbox identification number.

In Example 22, the mailbox identification number includes a mailbox index number and a mailbox serial number.

In Example 23, the mailbox index number includes a number of bits m that is less than or equal to a total number of mailbox components n within the mailbox array component.

In Example 24, the mailbox serial number including a number of bits that is less than or equal to m−n.

In Example 25, the computing device is further caused to initialize a global last serial number value to zero in response to a system startup operation, and in response to a request for mailbox allocation, locate an unused mailbox component from the mailbox array component, retrieve a mailbox index number for the located unused mailbox component, assign a serial number to the located unused mailbox component, and assign a mailbox identification number to the located unused mailbox component that includes the mailbox index number and the serial number.

In Example 26, the computing device is further caused to receive a mailbox identification number from the one or more application components, determine whether the received mailbox identification number matches an existing mailbox identification number, if a match has been determined, confirm to the one or more application components that a match has been found, and if a match has not been determined, return a NULL value to the one or more application components.

In Example 27, the computing device is further caused to receive a reclaim request from the one or more application components identifying a mailbox component, and increase a mailbox identification number for the identified mailbox component.

In Example 28, the computing device is further caused to receive a request for firewall initialization, and allocate firewall record slots for each of the one or more mailbox components, each firewall record slot including a mailbox identification number and an application component address.

In Example 29, the computing device is further caused to receive a request for mailbox allocation from one or more application components, and create a new firewall record slot including an application component address associated with the one or more application components and a mailbox identification number for an available mailbox component.

In Example 30, the message further includes an application component address and the verification further causing the computing device to locate a mailbox component matching the mailbox identification number within a mailbox array component storing a plurality of mailbox components, compare an application component address associated with the located mailbox component with the received application component address, and instruct a co-processor to store the message in the located mailbox component if the application component address associated with the located mailbox component matches the received application component address.

In Example 31 an apparatus for establishing communication with a trusted execution environment may comprise means for receiving a message from one or more application components executed by a processor component, the message including a mailbox identification number, means for verifying the message by a firewall component executed by a co-processor component of the trusted execution environment, and, upon successful verification based upon at least the mailbox identification number, means for storing the message in a mailbox component matching the mailbox identification number.

In Example 32, the mailbox identification number may include a mailbox index number and a mailbox serial number.

In Example 33, the mailbox index number may include a number of bits m that is less than or equal to a total number of mailbox components n within the mailbox array component.

In Example 34, the mailbox serial number may include a number of bits that is less than or equal to m−n.

In Example, 35, the apparatus of Example 31 may further comprise means for initializing a global last serial number value to zero in response to a system startup operation, and in response to a request for mailbox allocation, means for locating an unused mailbox component from the mailbox array component, means for retrieving a mailbox index number for the located unused mailbox component, means for assigning a serial number to the located unused mailbox component, and means for assigning a mailbox identification number to the located unused mailbox component that includes the mailbox index number and the serial number.

In Example 36, the apparatus of Example 31 may further comprise means for receiving a mailbox identification number from the one or more application components, means for determining whether the received mailbox identification number matches an existing mailbox identification number, if a match has been determined, means for confirming to the one or more application components that a match has been found, and if a match has not been determined, means for returning a NULL value to the one or more application components.

In Example 37, the apparatus of Example 36 may further comprise means for receiving a reclaim request from the one or more application components identifying a mailbox component, and means for increasing a mailbox identification number for the identified mailbox component.

In Example 38, the apparatus of Example 31 may further comprise means for receiving a request for firewall initialization, and means for allocating firewall record slots for each of the one or more mailbox components, each firewall record slot including a mailbox identification number and an application component address.

In Example 39, the apparatus of Example 38 may further comprise means for receiving a request for mailbox allocation from one or more application components, and means for creating a new firewall record slot including an application component address associated with the one or more application components and a mailbox identification number for an available mailbox component.

In Example 40, the apparatus of Example 31 may include wherein the message further includes an application component address and the verification means may further comprise means for locating a mailbox component matching the mailbox identification number within a mailbox array component storing a plurality of mailbox components, means for comparing an application component address associated with the located mailbox component with the received application component address, and means for instructing a co-processor to store the message in the located mailbox component if the application component address associated with the located mailbox component matches the received application component address.

The invention claimed is:

1. An apparatus comprising:
a hardware processor component comprising a portion of a chipset, the hardware processor component to execute a host operating system component comprising one or more application components;
a hardware co-processor component comprising a portion of the chipset separate from the hardware processor component to execute a trusted execution environment, the trusted execution environment to perform secure operations for at least one of the one or more application components of the host operating system component, the trusted execution environment to include:
a mailbox array component to store one or more mailbox components, each mailbox component being associated with a mailbox identification number, the mailbox identification number to include a mailbox index number comprising a number of bits m, the number of bits m based on a total number of mailbox components n within the mailbox array component, m and n comprising positive integers;
a mailbox firewall initialization component to allocate firewall record slots for each of the one or more mailbox components, each firewall record slot including a mailbox identification number and an application component address; and
a mailbox firewall component to facilitate communication between the at least one of the one or more application components of the host operating system component and at least one of the one or more mailbox components of the trusted execution environment.

2. The apparatus of claim 1, the mailbox identification number including the mailbox index number and a mailbox serial number.

3. The apparatus of claim 2, the number of bits m less than or equal to the total number of mailbox components n within the mailbox array component.

4. The apparatus of claim 3, the mailbox serial number including a number of bits that is less than or equal to m−n.

5. The apparatus of claim 1, the trusted execution environment to include a mailbox allocation component to:
initialize a global last serial number value to zero in response to a system startup operation;
in response to a request for mailbox allocation:
locate an unused mailbox component from the mailbox array component;
retrieve a mailbox index number for the located unused mailbox component;
assign a serial number to the located unused mailbox component; and
assign a mailbox identification number to the located unused mailbox component that includes the mailbox index number and the serial number.

6. The apparatus of claim 1, the trusted execution environment to include a mailbox search component to:
receive a mailbox identification number from the one or more application components;
determine whether the received mailbox identification number matches an existing mailbox identification number;
when a match is determined, confirm to the one or more application components that a match has been found; and
when a match is not determined, return a NULL value to the one or more application components.

7. The apparatus of claim 6, the trusted execution environment to include a mailbox reclaiming component to:
receive a reclaim request from the one or more application components identifying a mailbox component; and increase a mailbox identification number for the identified mailbox component.

8. The apparatus of claim 1, the trusted execution environment to include a firewall mailbox allocation component to:
receive a request for mailbox allocation from one or more application components; and
create a new firewall record slot including an application component address associated with the one or more application components and a mailbox identification number for an available mailbox component.

9. A computer-implemented method comprising:
allocating firewall record slots for each of one or more mailbox components within a mailbox array component of a trusted execution environment executed by a hardware co-processor component, the trusted execution environment for performing secure operations for one or more application components of a host operating system component executed by a hardware processor component separate from the hardware co-processor component, each firewall record slot including a mailbox identification number and an application component address;
receiving a message from one or more application components of the host operating system component, the message including a mailbox identification number and an application component address associated with an application component, the mailbox identification number including a mailbox index number comprising a number of bits m, the number of bits m based on a total number of the one or more mailbox components n, m and n comprising positive integers;
verifying the message by a firewall component of the trusted execution environment based on the mailbox identification number and the application component address associated with the application component; and
storing the message in a mailbox component matching the mailbox identification number based on verification of the message by the firewall component.

10. The computer-implemented method of claim 9, the mailbox identification number including the mailbox index number and a mailbox serial number.

11. The computer-implemented method of claim 10, the number of bits m less than or equal to the total number of mailbox components n within the mailbox array component.

12. The computer-implemented method of claim 11, the mailbox serial number including a number of bits that is less than or equal to m−n.

13. The computer-implemented method of claim 9, further comprising:
initializing a global last serial number value to zero in response to a system startup operation; and
in response to a request for mailbox allocation:
locating an unused mailbox component from the mailbox array component;
retrieving a mailbox index number for the located unused mailbox component;
assigning a serial number to the located unused mailbox component; and
assigning a mailbox identification number to the located unused mailbox component that includes the mailbox index number and the serial number.

14. The computer-implemented method of claim 9, further comprising:
receiving a mailbox identification number from the one or more application components;
determining whether the received mailbox identification number matches an existing mailbox identification number;
if a match has been determined, confirming to the one or more application components that a match has been found; and
if a match has not been determined, returning a NULL value to the one or more application components.

15. At least one non-transitory machine-readable storage medium comprising instructions that, when executed by a computing device, cause the computing device to:
allocate firewall record slots for each of one or more mailbox components within a mailbox array component of a trusted execution environment executed by a hardware co-processor component, the trusted execution environment to perform secure operations for one or more application components of a host operating system component executed by a hardware processor component separate from the hardware co-processor component, each firewall record slot including a mailbox identification number and an application component address;
receive a message from one or more application components of a host operating system component, the message including a mailbox identification number and an application component address associated with an application component, the mailbox identification number including a mailbox index number comprising a number of bits m, the number of bits m based on a total number of the one or more mailbox components n, m and n comprising positive integers;
verify the message by a firewall component of the trusted execution environment based on the mailbox identification number and the application component address associated with the application component; and
store the message in a mailbox component matching the mailbox identification number based on verification of the message by the firewall component.

16. The at least one non-transitory machine-readable storage medium of claim 15, the mailbox identification number including the mailbox index number and a mailbox serial number.

17. The at least one non-transitory machine-readable storage medium of claim 16, the number of bits m less than or equal to a total number of mailbox components n within the mailbox array component.

18. The at least one non-transitory machine-readable storage medium of claim 17, the mailbox serial number including a number of bits that is less than or equal to m−n.

19. The at least one non-transitory machine-readable storage medium of claim 15, the computing device further caused to:
initialize a global last serial number value to zero in response to a system startup operation; and
in response to a request for mailbox allocation:
locate an unused mailbox component from the mailbox array component;
retrieve a mailbox index number for the located unused mailbox component;
assign a serial number to the located unused mailbox component; and
assign a mailbox identification number to the located unused mailbox component that includes the mailbox index number and the serial number.

\* \* \* \* \*